US012616213B1

(12) United States Patent
Motl et al.

(10) Patent No.: US 12,616,213 B1
(45) Date of Patent: *May 5, 2026

(54) METHOD OF MANUFACTURE AND COMPOSITION OF A DOUGH BASED ITEM INCLUDING PROTEIN

(71) Applicant: Tyson Foods, Inc., Springdale, AR (US)

(72) Inventors: Shanna Motl, Chicago, IL (US); Mike Langham, Chicago, IL (US); Russell Thomas, Chicago, IL (US); Travis Ellis, Chicago, IL (US)

(73) Assignee: Tyson Foods, Inc., Springdale, AR (US)

( * ) Notice: Subject to any disclaimer, the term of this patent is extended or adjusted under 35 U.S.C. 154(b) by 46 days.

This patent is subject to a terminal disclaimer.

(21) Appl. No.: 16/519,697

(22) Filed: Jul. 23, 2019

(51) Int. Cl.
| | |
|---|---|
| *A21D 2/26* | (2006.01) |
| *A21C 11/00* | (2006.01) |
| *A21D 8/02* | (2006.01) |
| *A21D 8/06* | (2006.01) |
| *A21D 13/42* | (2017.01) |

(52) U.S. Cl.
CPC ............ *A21D 2/261* (2013.01); *A21C 11/008* (2013.01); *A21D 2/264* (2013.01); *A21D 8/02* (2013.01); *A21D 8/06* (2013.01); *A21D 13/42* (2017.01)

(58) Field of Classification Search
None
See application file for complete search history.

(56) References Cited

U.S. PATENT DOCUMENTS

| | | | | |
|---|---|---|---|---|
| 5,320,859 | A * | 6/1994 | Namdari | A21D 2/26 426/549 |
| 2004/0081738 | A1* | 4/2004 | Murty | A21D 13/40 426/557 |
| 2006/0003071 | A1* | 1/2006 | Faa | A21D 13/40 426/549 |
| 2007/0092619 | A1 | 4/2007 | Ning et al. | |
| 2010/0303991 | A1* | 12/2010 | Karwowski | A21D 2/186 426/560 |
| 2013/0040027 | A1* | 2/2013 | Lombard | A23K 50/40 426/332 |
| 2017/0094980 | A1 | 4/2017 | Kelly | |
| 2017/0188613 | A1* | 7/2017 | Rosales | A23L 13/67 |

(Continued)

*Primary Examiner* — Lien T Tran
(74) *Attorney, Agent, or Firm* — UB Greensfelder LLP; Mark E. Stallion

(57) ABSTRACT

A method of manufacture and a composition for the technology as disclosed herein, which includes a method of manufacture and composition for a dough tortilla item including protein. The dough tortilla composition as disclosed and claimed herein can be manufactured using a corn masa based flour and/or utilizing other grain based flours such corn, rice, barley. For one implementation of the technology other leguminous based flours or chestnut base flours, or various bean base powder, or cauliflower based powders used individually or in combination with any of the other types of flours described herein. The technology as disclosed and claimed provides a dough based tortilla or other dough based item that is a protein enhanced alternative to conventional tortillas and other dough based products. This invention results in a dough tortilla that has more protein, more complete protein, and fewer carbohydrates than conventional wheat dough tortilla.

7 Claims, 6 Drawing Sheets

(56)  References Cited

U.S. PATENT DOCUMENTS

2018/0213803  A1      8/2018  Shah et al.
2018/0242596  A1      8/2018  Lynch
2019/0297901  A1*    10/2019  Patel ...................... A21D 13/41

* cited by examiner

214

Mixture then extruded onto a set of rollers

216

Rolled to appropriate thickness

218

Tortillas/chips are cut from the masa sheet

220 — Three-pass oven and baked

222 — Based product emerges on to cooling belts where they spend   time  t   in a cooled chamber 224 — Tortillas/chips emerge on a payout belt where they are culled

226

Passes onto the counter/stacker where stacks are counted and stacked

228

Product is packaged

FIG. 2E

METHOD OF MANUFACTURE AND COMPOSITION OF A DOUGH BASED ITEM INCLUDING PROTEIN

BACKGROUND

Field

This technology as disclosed herein relates generally to methods of manufacturing and compositions of dough and, more particularly, to methods of mixing ingredients for dough and composition of ingredients for dough.

Background

In recent years, a trend in food product development has been toward providing products suitable for both quick preparation and convenient consumption. Manufacturers of these food items often produce them in shelf ready configurations and are often provided precooked and frozen. Even though many new products meeting these needs have been introduced commercially in recent years, there remains a need for a greater variety of healthful yet convenient products. The ability to commercially produce and sell any specific food product often depends on whether the product can be produced with economies of scale or other efficiencies while still meeting the other criteria of both quick preparation and convenient consumption. Various bakery products have been developed that provide both quick preparation and convenient consumption, including various precooked pizza doughs, bread sticks, flat breads, pitas and tortillas. However, these doughs and breads don't provide much nutritional value.

Dough products, generally speaking, can be difficult to manufacture in a large production environment and filled dough products even more so, can present handling and processing challenges that can be difficult to overcome while achieving the flexibility and processing speeds desirable for economical manufacturing. Dough products, whether filled or unfilled, tend to be sticky at some point during their manufacture, which can cause them to be difficult to handle or require equipment cleaning steps once handled. If fillings or toppings are included in a product, the steps of applying or inserting a filling or topping in a way that minimizes waste or mess can present additional challenges. Preparation of leavened/unleavened dough products may also require the dough to increase in volume upon expansion during a proofing, leavening, or rising step, or when baked. Such expansion will affect oven or proof box space, time, and possibly final packaging size requirements. With these difficulties, little has been produced in the food industry that modifies the basic dough processes in order to improve the nutritional value of the dough item itself. It would be desirable to provide new ways to achieve efficiencies in the manufacture of dough products, including filled dough products, that also improves the nutritional value of the dough product.

Tortillas are manufactured commercially by forming a dough, flattening the dough to form dough flats, and baking the flats until they leaven and ultimately set. Representative manufacturing processes include pressing, die cutting and hand cutting. The dough typically comprises flour, a leavening system, and water. In case of a tortilla dough, a corn system includes corn, lime and water. The leavening system comprises a leavening base and one or more leavening acids. The leavening base and leavening acid(s) react to yield carbon dioxide (neutralization reaction), which, along with any other gases present, leavens the dough. A problem that can arise during manufacture of tortillas is inadequate pliability and strength of the dough. Conventionally, modifying the dough to make it more pliable has weakened the dough. Modifying the dough to strengthen it has made it less pliable. Inadequate pliability and strength negatively impact the handling and processing of the dough as well as the properties of the end product tortilla/chip. Inadequate pliability renders the dough more difficult to handle and process. Inadequate strength reduces the ability of the dough to retain gas during handling and processing. With these difficulties, little has been produced in the food industry that modifies the basic dough processes for tortillas and other like items in order to improve the nutritional value of the dough item itself. It would be desirable to have a dough composition having excellent pliability and strength that also has increased nutritional value. It would be desirable to have a method for manufacturing tortillas wherein the tortillas have excellent physical and product properties and increased nutritional value.

A better method of manufacturing and a better composition for a tortilla dough item is needed for improving its nutritional value and that is suitable for both quick preparation and convenient consumption.

SUMMARY

The technology as disclosed herein includes a method of manufacture and composition for a dough tortilla item including protein. Dough is a thick, malleable, sometimes elastic, paste made out of any grains, leguminous or chestnut crops. Dough for a tortilla is traditionally manufactured by mixing corn masa based flour with a small amount of water and/or other liquid, and sometimes includes yeast and/or other leavening agents as well as other ingredients such as salt, baking powder (a traditional corn tortilla doesn't include baking powder), various fats, oils and/or flavorings. Prepared shelf-ready dough based products are often partially or fully cooked for both quick preparation and convenient consumption. The dough is utilized to produce several different types of dough based items including tortillas. The technology as disclosed and claimed herein and its various implementations and embodiments is a modified method of manufacture and a composition for a dough item that includes protein.

The dough tortilla composition as disclosed and claimed herein can be manufactured using a corn masa based flour and/or utilizing other grain based flours such corn, rice, barley. For one implementation of the technology other leguminous based flours or chestnut base flours, or various bean base powder, or cauliflower based powders used individually or in combination with any of the other types of flours described herein. For one implementation a tuber based flour is also utilized individually or in combination with others. One implementation of the method of manufacture and composition for dough as disclosed and claimed herein is utilized for tortillas. However, the technology as disclosed and claimed here in is adjusted to be used for various flatbreads such as pita, lafa, lavash, matzah, naan, roti, sangak, tortilla and/or yufka. On implementation of the technology is also adjusted for use in pastas, noodles and/or crackers or other snack items. For one implementation of the technology as disclosed and claimed, the protein utilized is chicken breast meat. Yet other implementations of the technology as disclosed and claimed herein utilizes one or more animal based proteins such as pork, beef, turkey, mouton, and/or other animal meat based proteins utilized individually or with other proteins. Yet other implementations of the technology as disclosed and claimed herein utilize plant based proteins, such as soybean, taken individually or combined with other proteins. Yet another implementation utilizes distiller's grain.

The technology as disclosed and claimed provides a dough based tortilla or other dough based item that is a healthier alternative to conventional tortillas and other dough based products. This invention results in a dough tortilla that has more protein, more complete protein, and fewer carbohydrates than conventional wheat dough tortilla. This product turns a traditionally less-healthy food into something that has more protein and lower carbohydrates. Furthermore, this dough tortilla is a better alternative for people with health issues that are exacerbated by carbohydrates and dough based items, or those who are health conscious but like to indulge occasionally. This invention incorporates animal protein (chicken) into a traditional dough based tortilla. For other implementations, one or more other proteins are incorporated including, pork, beef, turkey, mouton, and/or other animal meat based proteins utilized individually or with other proteins. Yet other implementations of the technology as disclosed and claimed herein utilize plant based proteins, such as soybean, taken individually or combined with other proteins. Further, modified plant proteins can be utilized such as plant proteins modified with higher concentration of protein or plant proteins modified to resemble the protein of animal meat. This creates a more protein enriched tortilla without sacrificing the tortilla texture and flavor that consumers know and expect.

The raw chicken dough handles similarly to normal doughs. Therefore, it can potentially be made into serval different bread forms flat breads, pitas, tortillas, etc. The final product gives operators a healthier item to menu at their establishment without requiring additional equipment in the kitchen. Furthermore, consumers will feel better about eating this and serving it since it is more protein enriched than regular wheat and corn dough based tortillas.

The technology as disclosed herein includes a method of manufacture and composition for a tortilla dough item including protein. The method of manufacture includes a step of processing chicken breast meat that includes grinding chicken breast meat by finely grounding the meat protein at an about approximately 3⁄32″ grinding size, plus or minus 1⁄32″ grinding size. The ground chicken is mixed with corn masa, water and seasonings. The dough is pressed and par-cooked/fully cooked through corn tortilla oven. One implementation of the composition includes at least about approximately 56 percent chicken breast meat, plus or minus 10 percent, about approximately 34 percent corn masa, plus or minus 5 percent, up to 12 percent water, plus or minus 3 percent, 0.7% salt, plus or minus 0.2 percent of the total by weight. For one implementation of the composition the tortilla product contains more than 55% chicken breast meat of the total by weight.

An approximately 3 g chicktilla chip (tortilla chip enhanced with chicken protein) contains about approximately 0.75 g protein (25%), plus or minus 0.15 grams. For one implementation, an approximately 12 g tortilla contains about approximately 7 g protein. For one implementation, a serving size of tortillas is 46 g to 56 g, which is about 3 tortillas. For one implementation the tortilla is fried such that the chips are considered shelf stable and having lower carbs than a regular corn tortilla chip. Another implementation of the composition of the tortilla includes 60% chicken, plus or minus 2 percent, 30% corn masa, plus or minus 2 percent, 6% water, plus or minus 1 percent, and 0.7% salt, plus or minus 0.1 percent. Yet another implementation of the composition of the tortilla includes 65% chicken, plus or minus 2 percent, 25% corn masa, plus or minus 2 percent, 5.5% water, plus or minus 0.4 percent, and 0.7% salt, plus or minus 0.2 percent. Yet another implementation of the composition for the tortilla includes 52% chicken, plus or minus 2 percent, 32% corn masa, plus or minus 2 percent, 6% skin, plus or minus 1 percent, 10 percent water, plus or minus 2 percent, and 0.7% salt, plus or minus 0.1 percent. For one implementation of the product where the Tortilla is 62% chicken, the calories per 56 g of product is approximately 150 calories, there is approximately 11 g of protein and approximately 20 g of total carbohydrates. For one implementation of the product where the Tortilla is 75% chicken, the calories per 56 g of serving of product is approximately 110 calories, there is approximately 12 g of protein and approximately 12 g of total carbohydrates. For one implementation of the product where the Tortilla is 56% chicken, the calories per 48 g of serving of product is approximately 120 calories, there is approximately 7 g of protein and approximately 8 g of total carbohydrates. For one implementation, the composition includes black beans for higher protein.

For various different implementations, various corn masa (grit size, whole grain, yellow vs white) Distillers Grain, Wheat flour, Various Bean Powders, Cauliflower powder are utilized individually or in combination for varying texture and flavor. For one implementation of the composition antioxidants are included for improving shelf life quality for refrigerated items. For one implementation various flavor enhancing ingredients are added to the composition in appropriate amounts. Various protein powders (chicken, beef, whey or vegetable protein powders) are added for one implementation. For one implementation of the technology as disclosed and claimed, the protein utilized is chicken breast meat. Yet other implementations of the technology as disclosed and claimed herein utilizes one or more animal based proteins such as pork, beef, turkey, mouton, and/or other animal meat based proteins utilized individually or with other proteins. Yet other implementations of the technology as disclosed and claimed herein utilize plant based proteins, such as soybean, taken individually or combined with other proteins. Further, modified plant proteins can be utilized such as plant proteins modified with higher concentration of protein or plant proteins modified to resemble the protein of animal meat.

One implementation of the method of manufacture includes the step of mixing corn masa flour, which in different implementations is interchanged with different types of masa, grains or other dry ingredients, with water, at a temperature between approximately 35-50 degrees Fahrenheit for working with animal proteins. The masa flour and water mixture is further mixed with fresh ground animal protein. For one implementation, the animal protein is chicken breast meat. The masa moisture level will vary. The amount of masa mixture will vary based on the dry ingredients and animal protein used. The mixture is pressed and cooked fully for some implementation and partially for others. The method of manufacture, for one implementation, includes only par-cooking the meat tortillas for certain end uses. For example, if the meat tortilla is to be used for fried chips or a fried taquito, the method of manufacture would only par cook at this stage, and fully cook in a fry step later.

One implementation of a method of manufacture of a dough based item includes mixing a quantity of flour, water, salt and protein in a blender, thereby forming a dough item. The method of manufacture further includes one or more of extruding/sheeting and/or pressing the dough comprising flour, water, salt and protein onto a set of rollers and thereby rolling the extruded dough in to a sheet having a specified thickness and cutting the extruded and rolled sheet into smaller pieces. The method includes baking the smaller pieces at a specified temperature and for a specific period of time; and cooling the smaller pieces in a cooling chamber. For one implementation of the technology, the flour is one or more of a corn-masa flour and a wheat flour. The method of manufacture varies in that the protein is one or more of chicken meat, turkey meat, pork, beef, venison, and mutton. For on implementation of the method, mixing is for a duration of about approximately 2-20 minutes and were the water is at a temperature of 35-60 degrees.

For one implementation of the composition for a dough based item the composition includes a dough mixture comprising 52% to 60% protein by weight of total mixture; 30% to 32% flour by weight of total mixture; approximately 9.3% water by weight of total mixture; and approximately 0.7% Salt by weight of total mixture. For one implementation of the composition for a dough based item, the composition includes 1% to 6% chicken skin by weight of total mixture; and where the 52% to 60% protein is 52% to 65% chicken by weight of total mixture. For yet another implementation, the composition includes a dough mixture comprising 52% to 75% protein by weight of total mixture; 15% to 32% flour by weight of total mixture; up to approximately 9.3% water by weight of total mixture; and up to approximately 0.7% Salt by weight of the total mixture.

For one implementation of the composition for a dough based item the composition includes dry ingredients added for one or more of flavor and increased shelf life. For one implementation of the composition, chicken is approximately 52% by weight of the total mixture; the flour is approximately 32% by weight of the total mixture; the skin is approximately 6% by weight of the total mixture; the water is approximately 9.3% by weight of the total mixture and the salt is approximately 0.7% plus or minus 0.2% by weight of the total mixture. For one implementation of the composition, the flour is one or more of a corn masa flour, a wheat flour, a cauliflower powder flour; a bean based powder flour; and a tuber based flour and/or the protein is one or more of ground chicken meat protein, ground turkey meat protein, ground pork protein, ground beef protein and ground mutton protein.

The features, functions, and advantages that have been discussed can be achieved independently in various implementations or may be combined in yet other implementations further details of which can be seen with reference to the following description and drawings.

These and other advantageous features of the present technology as disclosed will be in part apparent and in part pointed out herein below.

BRIEF DESCRIPTION OF THE DRAWINGS

For a better understanding of the present technology as disclosed, reference may be made to the accompanying drawings in which:

Figure 2E:
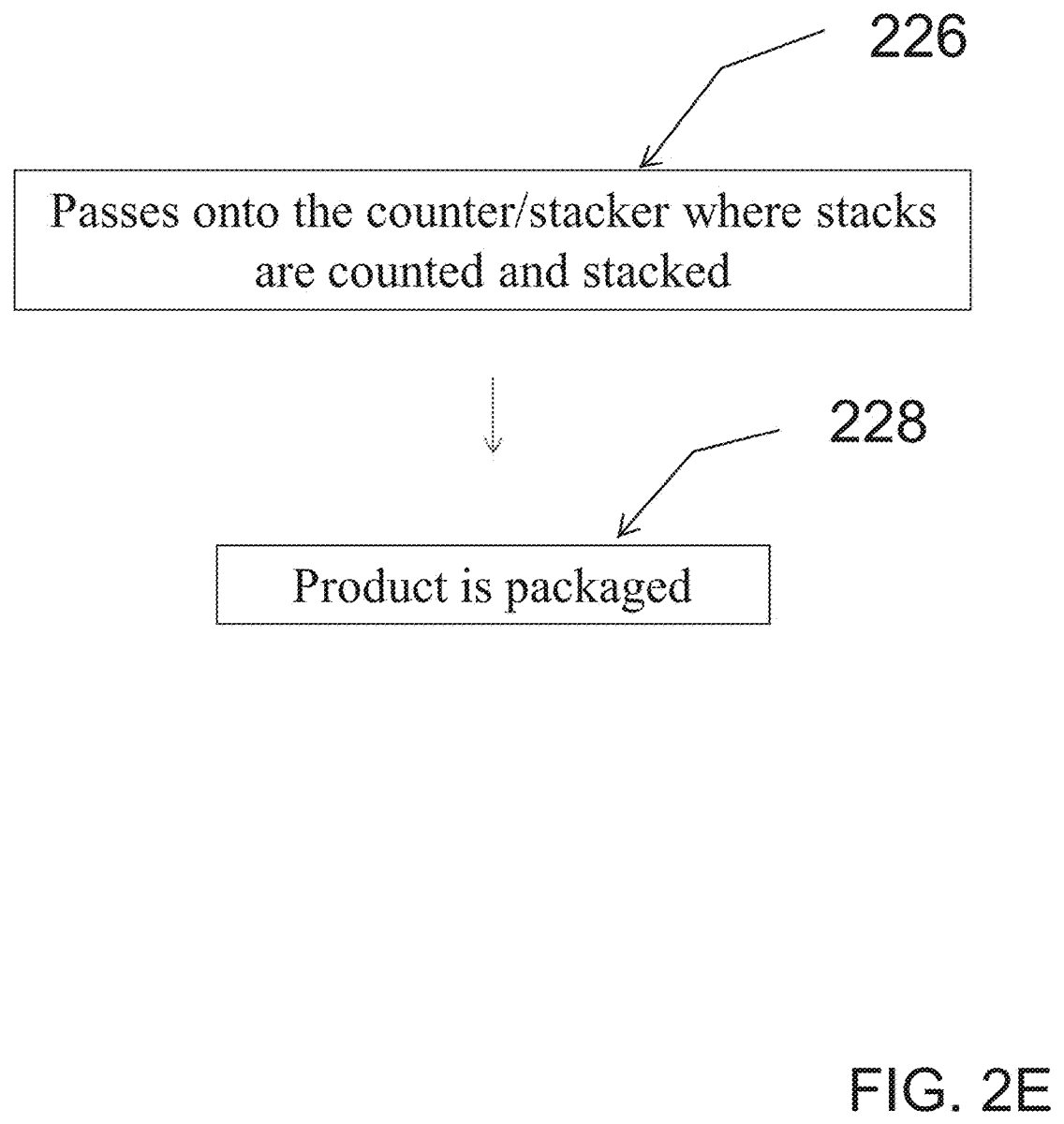

FIGS. 2A through 2E is a process flow of the manufacturing method.

Figure 1:
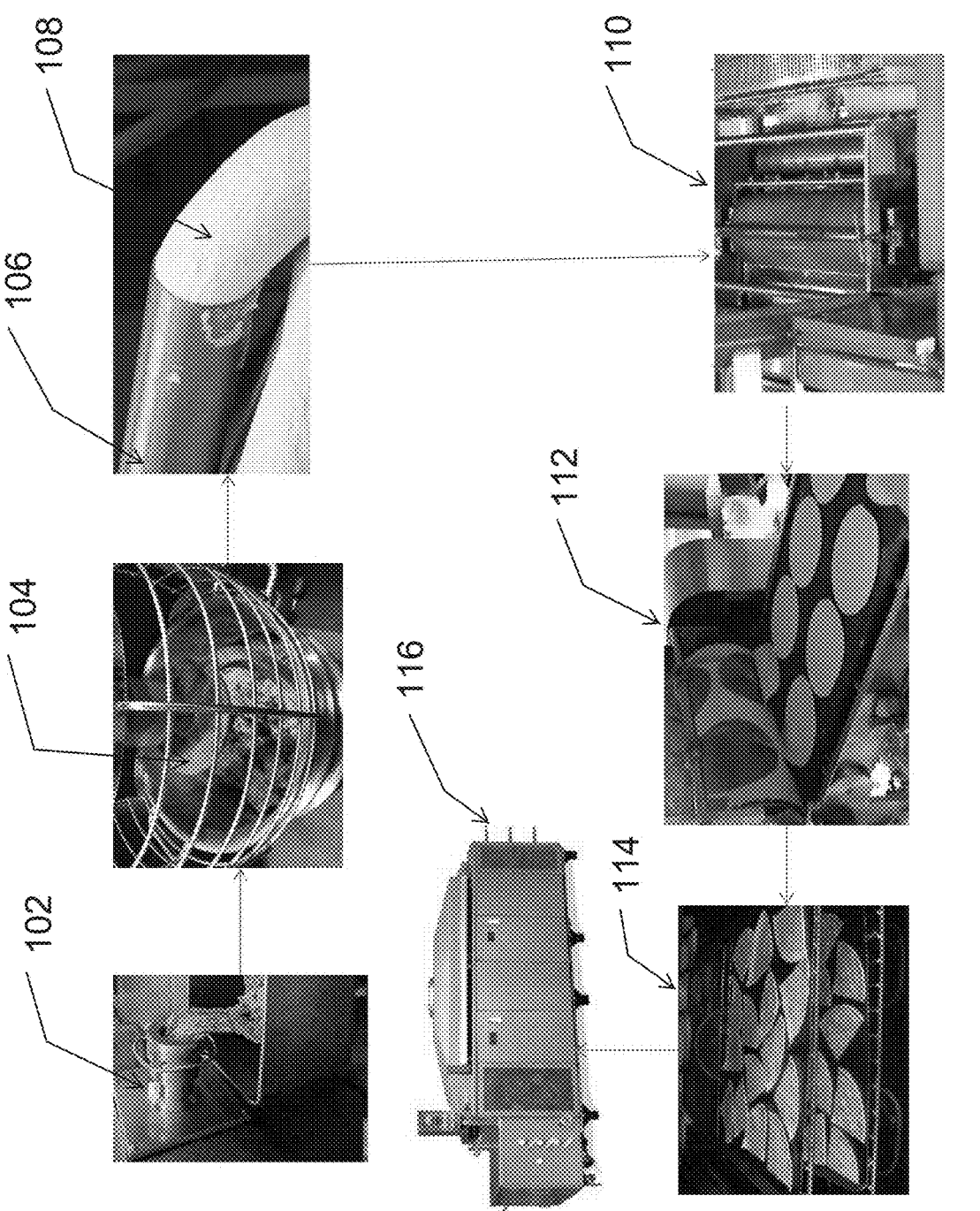
FIG. 1 is an illustration of the manufacturing stations and flow.
Figure 2A:
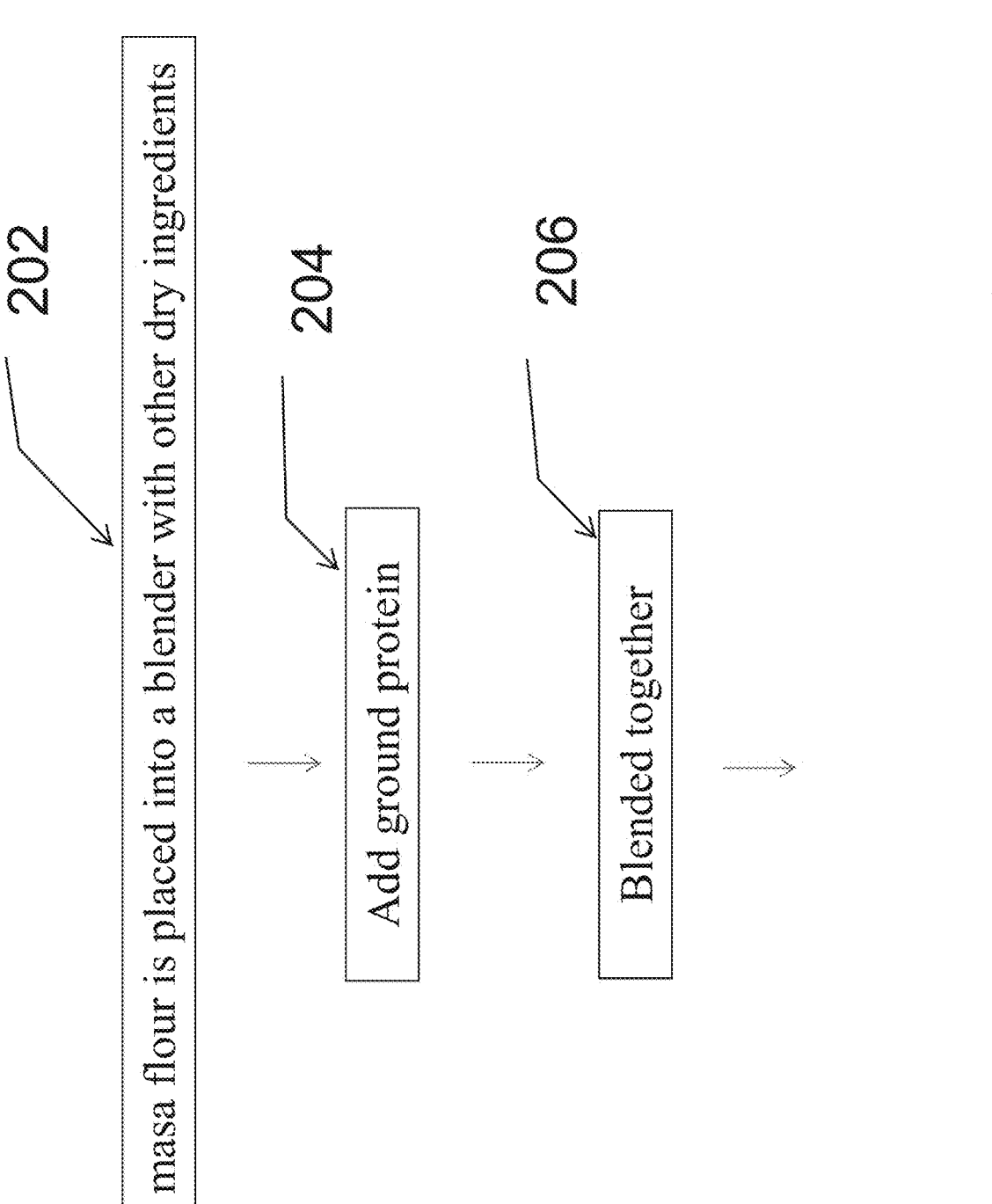
Figure 2B:
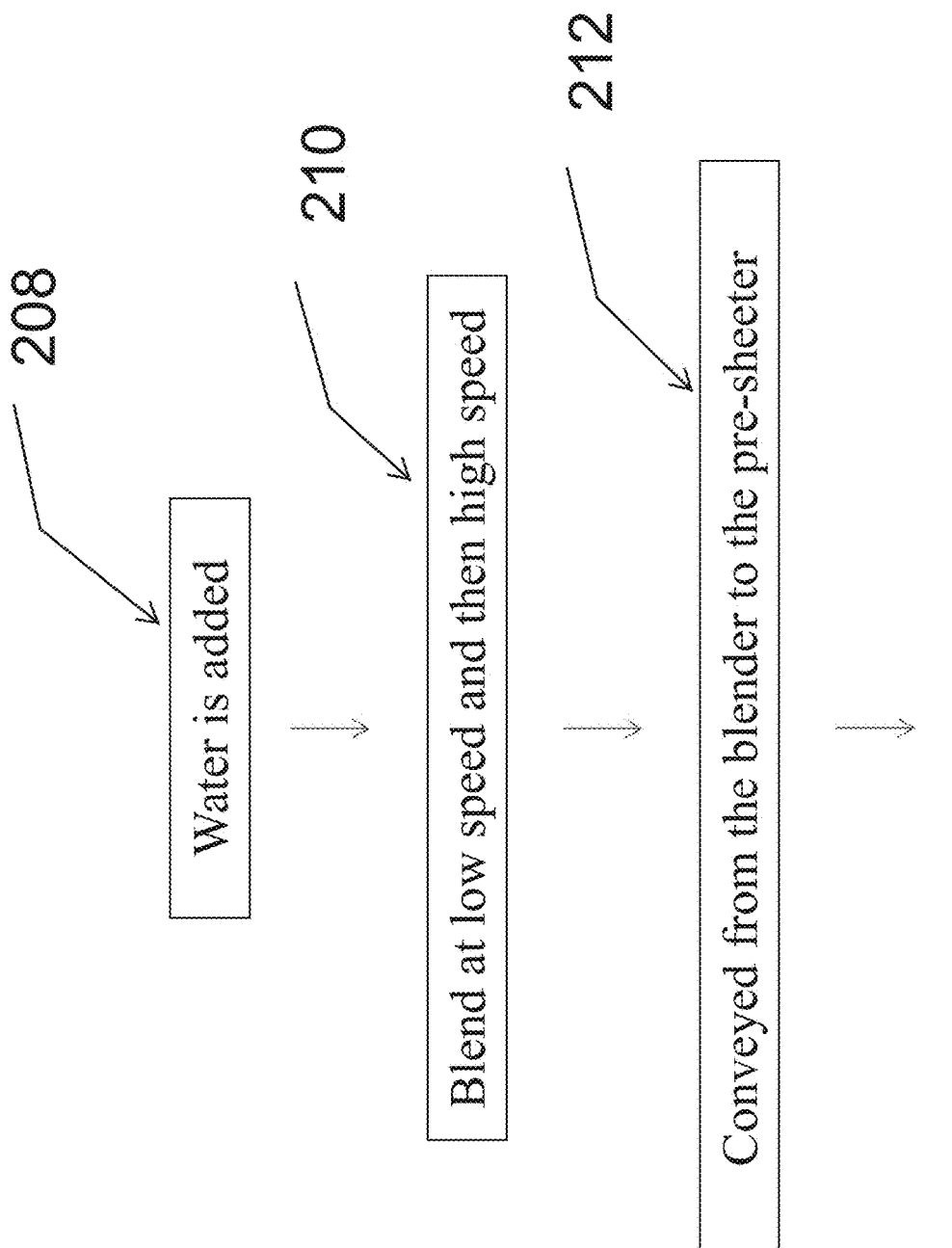
Figure 2C:
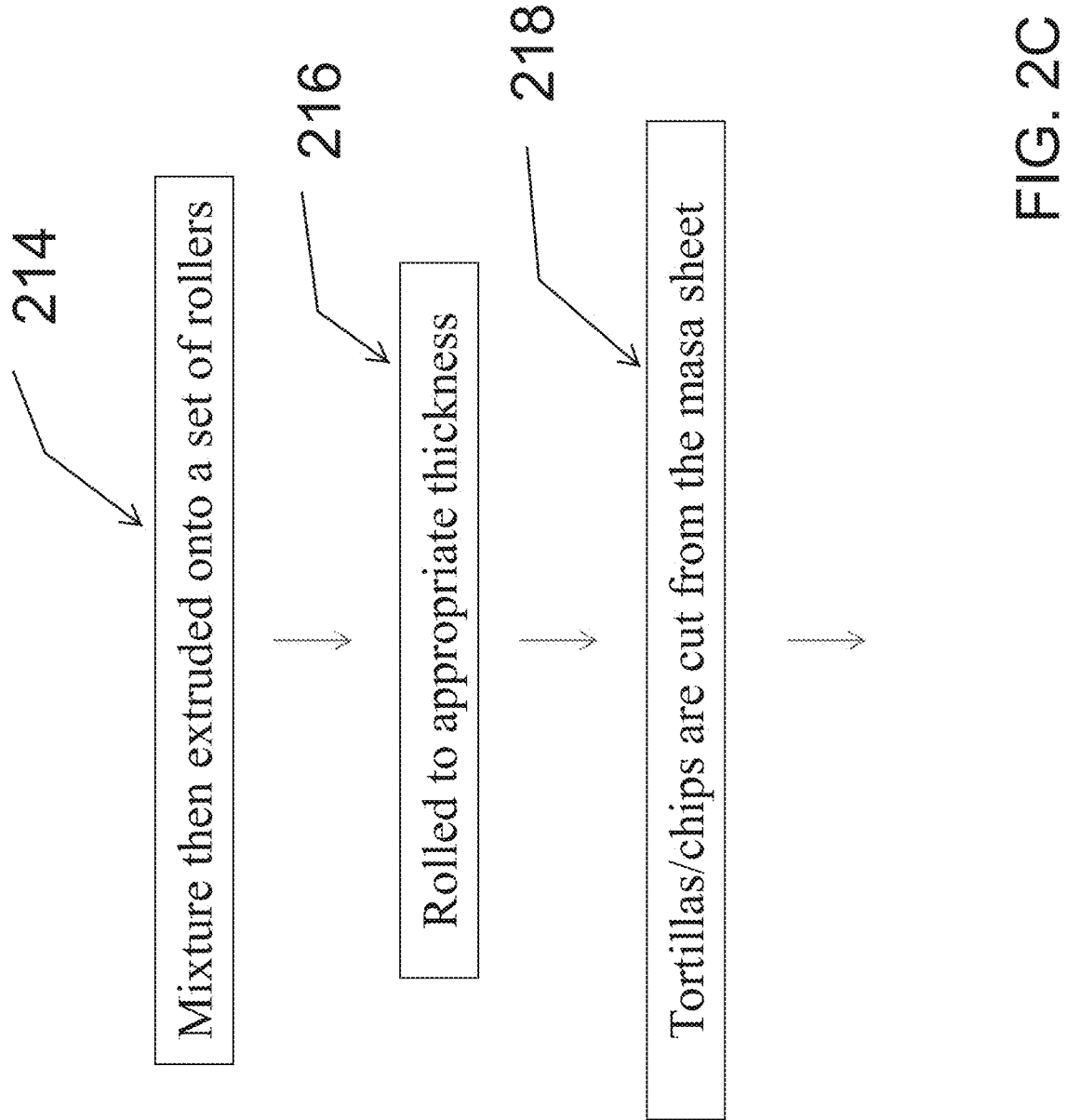
Figure 2D:
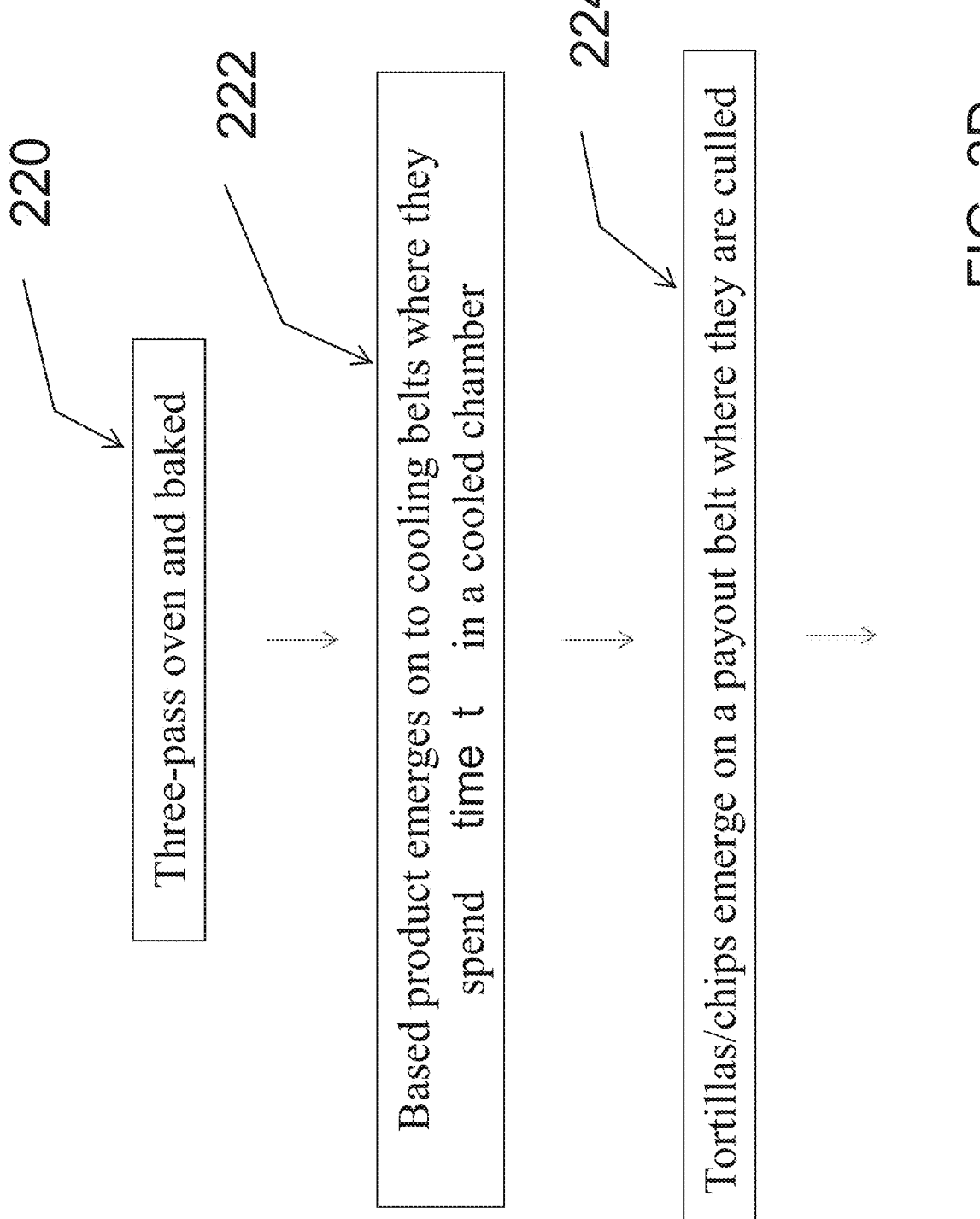

While the technology as disclosed is susceptible to various modifications and alternative forms, specific implementations thereof are shown by way of example in the drawings and will herein be described in detail. It should be understood, however, that the drawings and detailed description presented herein are not intended to limit the disclosure to the particular implementations as disclosed, but on the contrary, the intention is to cover all modifications, equivalents, and alternatives falling within the scope of the present technology as disclosed and as defined by the appended claims.

DESCRIPTION

According to the implementation(s) of the present technology as disclosed, various views are illustrated in FIG. 1-2 and like reference numerals are being used consistently throughout to refer to like and corresponding parts of the technology for all of the various views and figures of the drawing. Also, please note that the first digit(s) of the reference number for a given item or part of the technology should correspond to the Fig. number in which the item or part is first identified. Reference in the specification to "one embodiment" or "an embodiment"; "one implementation" or "an implementation" means that a particular feature, structure, or characteristic described in connection with the embodiment or implementation is included in at least one embodiment or implementation of the invention. The appearances of the phrase "in one embodiment" or "in one implementation" in various places in the specification are not necessarily all referring to the same embodiment or the same implementation, nor are separate or alternative embodiments or implementations mutually exclusive of other embodiments or implementations.

One implementation of the present technology as disclosed comprising a method of manufacture and a composition for a dough tortilla including protein teaches a novel method of manufacture and composition for a dough tortilla having increased nutritional value as compared to traditional dough items.

The details of the technology as disclosed and various implementations can be better understood by referring to the figures of the drawing. Referring to FIG. 1, an illustration of the various process stations are provided. The process stations shown are an illustration. The method of manufacture includes the process step of placing corn masa flour into a blender with other dry ingredients and blended together at a blending station 104. Water is added, and ingredients mixed to rehydrate the masa flour at the blending station 104. Size reduced chilled animal protein 102 is added to the mixture where size reducing the protein is performed by using a meat grinder at the size reduction station 102. The mixture is blended at low speed and at a high speed. The masa mixture is conveyed 106 from the blender to the pre-sheeter station 110 by belts or pumped through pipes and cones to the sheeter. The masa mixture having animal protein is extruded 108 onto a set of rollers (stainless steel sandblasted or coated with Teflon® for a non-stick surface), and rolled to an appropriate thickness and the masa sheet is cut to a size for tortillas and/or chips at a tortilla cutting station 112 or a chip cutting station 114. The tortillas/chips enter a three-pass oven and baked at a baking station 116.

Referring to FIGS. 2A through 2E, a process flow of the manufacturing method is provided. The method of manufacture includes the process step of placing corn masa flour into a blender with other dry ingredients and blended together 202 for 30-60 seconds. Water is added 208, where the water temperature is 35-50 degrees Fahrenheit, and ingredients mixed to rehydrate the masa flour. Ground chilled animal protein, chilled at a core temperature of about approximately 36 degrees Fahrenheit, plus or minus 3 degrees Fahrenheit, and is added 204 to the mixture where the grind of the animal protein is at ³⁄₃₂", plus or minus ¹⁄₃₂", using a meat grinder. The mixture is blended at low speed 210 in a sigma blade type mixer at a speed of at about approximately 60 rpms, plus or minus 5 rpms, and at a high speed 210 at a speed of about approximately 90 rpms, plus or minus 10 rpms, for 2-10 minutes total mix time. The masa moisture is 48-50% and masa temperature is 35-40° F. For one implementation of the process the equipment is a sigma blade mixer from Peerless™ or JC Ford™ or a mixer providing comparable mixing agitation action.

The masa mixture is conveyed 212 from the blender to the pre-sheeter by belts or pumped through pipes and cones to the sheeter. For one implementation of the process the equipment is a JC Ford™ twin screw extruder or Waukesha® pumps or a substantially similar extruder and pump. Although the equipment may vary depending on the application. The masa mixture having animal protein is extruded 214 onto a set of rollers (stainless steel sandblasted or coated with Teflon® for a non-stick surface), and rolled to an appropriate thickness 216 and the masa sheet is cut to a size for tortillas and/or chips 218. For one implementation the specified thickness is about approximately ¹⁄₁₆ inch(es) to about approximately ¼ inch(es). The cutter size and shape depends upon desired product and is made from ultra-high-molecular weight polyethylene (UHMW) or brass materials. For one implement of the process the equipment is a sheeter and cutter from Casa Herrera™ or JC Ford™ or comparable piece of equipment.

The tortillas/chips enter a three-pass oven and baked 220 with slatted belt material for 16-30 seconds at 300-600° F. depending on oven functional status. Product temperatures are above 165 degrees Fahrenheit, plus or minus about approximately 25 degrees Fahrenheit upon exit. Products that need to be par-cooked for function purposes, will have temperatures between 150-155 F and will be cooked for 20-25 seconds of time. For implementation of the process to produce tortilla chips the temperature is lower. For one implementation of the process the equipment is ovens from Casa Herrera™ or JC Ford™ or a substantially similar piece of equipment. For one implementation of the process, for tortillas having chicken, the temperature will have an exit temperature of 200-250 degrees Fahrenheit and will be cooked for 20-30 seconds. The baked product emerges on to cooling belts where they spend 1-2 minutes in a cooled chamber 222. Target packaging temperatures is less than 70 F. For one implementation of the process the equipment cooling belts by Casa Herrera™ and JC Ford™ or comparable equipment manufactured to meet cooling requirements. After cooling, the tortillas/chips emerge on a payout belt where they are culled 224. For one implementation of the process the cull equipment is the Lawrence Equipment™ Accuview™ or a comparable piece of equipment. For one implementation of the process the baked corn chips are scanned for metal. For one implementation of the process the metal detection equipment is the Safeline™ and Ceia® or comparable material.

The tortilla product passes onto the counter/stacker where stacks are counted and stacked 226 and released to a package 228. For one implementation of the process for stacking and counting the equipment is a counter and stacker by Casa Herrera™ or JC Ford™ or substantially similar piece of equipment. The tortilla product is conveyed up a bucket elevator and deposited into poly lined cases and weighed at net case weights. For one implementation of the technology, the equipment is a Casa Herrera™ or JC Ford™ weigh scale systems. The product is packaged. For one implementation of the process the tortilla product is manually placed into poly bags and taped close. One implementation for the process of sealing the product into poly bags includes gas flushing and/or vacuum sealing. For one implementation of the process the equipment is an InnoSeal® or Novum™ tape closer and Poly non-barrier bags from Nex Gen™ or a substantially similar product. The tortilla chip product is bulk packaged into poly lined cases. The packaging for the product for one implementation is one or more of gas flushed and vacuum sealed.

For one implementation of the product where the Tortilla is 62% chicken, the calories per 56 g of product is approximately 150 calories, there is approximately 11 g of protein and approximately 20 g of total carbohydrates. For one implementation of the product where the Tortilla is 75% chicken, the calories per 56 g of serving of product is approximately 110 calories, there is approximately 12 g of protein and approximately 12 g of total carbohydrates. For one implementation of the product where the Tortilla is 56% chicken, the calories per 48 g of serving of product is approximately 120 calories, there is approximately 7 g of protein and approximately 8 g of total carbohydrates.

The various implementations and examples shown above illustrate a method of manufacture and composition for a dough based tortilla having protein. A user of the present method and system may choose any of the above implementations, or an equivalent thereof, depending upon the desired application. In this regard, it is recognized that various forms of the subject tortilla with protein method of manufacture and composition could be utilized without departing from the scope of the present technology and various implementations as disclosed.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present implementation(s). Accordingly, the specification and drawings are to be regarded in an illustrative rather than a restrictive sense Other aspects, objects and advantages of the present technology as disclosed can be obtained from a study of the drawings, the disclosure and the appended claims.

What is claimed is:

1. A composition for a dough based item comprising:
   a dough mixture comprising, 52% to 75% chilled animal meat derived protein by weight of total mixture;
   15% to 32% masa by weight of total mixture; up to 9.3% water by weight of total mixture; and
   up to approximately 0.7% Salt by weight of total mixture, where the chilled animal meat derived protein is size reduced.

2. The composition for a dough based item as recited in claim 1, comprising:
   1% to 6% animal Skin by weight of total mixture; and
   where the 52% to 75% chilled animal meat derived protein is 52% to 60% chicken by weight of total mixture.

3. The composition for a dough based item as recited in claim 2, comprising:
   one or more of a first ingredient that modifies flavor and a second ingredient that increases shelf life.

4. The composition for a dough based item as recited in claim 2, where the chicken is approximately 52% by weight of the total mixture; the masa is approximately 32% by weight of the total mixture; the animal skin is approximately 6% by weight of the total mixture; the water is approximately 9.3% by weight of the total mixture and the salt is approximately 0.7% by weight of the total mixture.

5. The composition for a dough based item as recited in claim 1, where the composition includes one or more of a cauliflower powder flour; a bean based powder flour; and a tuber based flour.

6. The composition for a dough based item as recited in claim 5, where the chilled animal meat derived protein is one or more of ground chicken meat derived protein, ground turkey meat derived protein, ground pork derived protein, ground beef derived protein and ground mutton derived protein.

7. The composition for a dough based item as recited in claim 6, where the chilled animal meat derived protein is ground to approximately ³⁄₃₂ of an inch.

\* \* \* \* \*